(12) United States Patent
Hansell et al.

(10) Patent No.: US 8,224,703 B2
(45) Date of Patent: Jul. 17, 2012

(54) FLUID PROCESS SYSTEM SELECTION

(75) Inventors: Chad Ryan Hansell, Lafayette, CO (US); Edmund J Doering, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 738 days.

(21) Appl. No.: 12/358,683

(22) Filed: Jan. 23, 2009

(65) Prior Publication Data
US 2009/0132946 A1 May 21, 2009

Related U.S. Application Data

(63) Continuation of application No. 10/503,522, filed as application No. PCT/US03/05013 on Feb. 19, 2003, now Pat. No. 7,565,309.

(60) Provisional application No. 60/361,767, filed on Mar. 1, 2002.

(51) Int. Cl.
*G06Q 30/00* (2006.01)
(52) U.S. Cl. ............................................. 705/26; 705/27
(58) Field of Classification Search ................. 705/26, 705/27
See application file for complete search history.

(56) References Cited

U.S. PATENT DOCUMENTS
2004/0024656 A1* 2/2004 Coleman ..................... 705/27

FOREIGN PATENT DOCUMENTS
| DE | 19614789 C1 | 9/1997 |
| EP | 1154364 A1 | 11/2001 |
| JP | 06044280 | 2/1994 |
| JP | 2001350512 A | 12/2001 |
| JP | 20011350791 | 12/2001 |
| JP | 2003260234 | 9/2003 |
| WO | WO-00/79453 A2 | 12/2000 |
| WO | WO-01/73615 A1 | 10/2001 |
| WO | WO-02/08944 A1 | 1/2002 |

OTHER PUBLICATIONS

Giuseppe Attardi, Antonia Cisternino, Maria Simi, Web-based Configuration Assistants, Artificial intelligence for Engineering Design, Analysis and Manufacturing, London, GB, vol. 12, No. 4, Sep. 1998, pp. 1-12, XP002902516.
T. Kimura "Promptly Utilize Order Information to Shorten Deliver Period", Nikkei Digital Engineering, Nikkei BP Corporation, 2002. 2. 15, vol. 51, p. 97-99 (Reference 4).
"Combustion Control motor/combustion control Valve", 2001.5.14, Retrieved on Aug. 24, 2011 from the Internet <URL:http://web.archive.org/web/20010514012527/http://www.compoclub.com/dispalyb?KatabanM=CCM21/CCV20>.

* cited by examiner

*Primary Examiner* — James Zurita
(74) *Attorney, Agent, or Firm* — The Ollila Law Group LLC

(57) ABSTRACT

A selection system (100) that selects fluid process systems is comprised of an interface (101, 103) and a processing system (102). The processing system (102) directs the interface (101, 103) to transfer a first signal that indicates user prompts. The interface (101, 103) receives a second signal that indicates user inputs provided responsive to the user prompts. The user inputs indicate fluid process information. The processing system (102) processes the fluid process information to select a first one of the fluid process systems. The processing system (102) obtains first performance and specification information for the first one of the fluid process systems. The processing system (102) directs the interface (101, 103) to transfer a third signal that indicates the first performance and specification information for the first one of the fluid process systems.

54 Claims, 6 Drawing Sheets

PERFORMANCE AND SPECIFICATION INFO FOR SELECTED SYSTEMS

| | 1ST SYSTEM | 2ND SYSTEM | PROCESS INFO |
|---|---|---|---|
| MODEL # | SENSOR CMF 200; XMTR 2700 | SENSOR CMF 100; XMTR 2700 | FLOW METER |
| MASS FLOW RATE | 3201 LB/MIN | 1000 LB/MIN | |
| MASS FLOW ACCURACY | 0.10% OF RATE | 0.10% OF RATE | 0.1-0.2 |
| PRESSURE LOSS AT MAX FLOW | 0.1 PSI | 0.61 PSI | |
| VELOCITY AT MAX FLOW | 2.2 FT/SEC | 5.9 FT/SEC | |
| FLOW REPEATABILITY | 0.05% | 0.05% | |
| MAX PRESSURE LOSS | 0-5 PSI | 0-5 PSI | 0-5 PSI |
| WETTED MATERIAL | 316L SS | 316L SS | 316L SS |
| XMTR FEATURES | ANALOG | ANALOG | ANALOG |
| MEASUREMENT VARIABLES | FLOW RATE; TEMP | FLOW RATE; TEMP | FLOW RATE |
| COMPATABILITY | 100% | 100% | |
| CONFIGURE ? | | | |

SUBMIT  CANCEL

400

PROCESS INFORMATION

| | |
|---|---|
| PRODUCT | ▼ |
| FLUID NAME | ▼ |
| WETTED MATERIAL | ▼ |
| MASS FLOW ACCURACY | ▼ |
| MAX PRESSURE LOSS | ▼ |
| MAX FLOW RATE | ▼ |
| MAX PROCESS PRESSURE | ▼ |
| MAX TEMPERATURE | ▼ |
| DENSITY | ▼ |
| VISCOSITY | ▼ |
| UNITS | ▼ |

MEASUREMENT VARIABLES

☐ FLOW RATE
☐ TOTAL FLOW
☐ DENSITY
☐ TEMPERATURE

TRANSMITTER FEATURES

☐ ANALOG ☐ DIGITAL
☐ COM PROTOCOL #1 ☐ MOUNT#1
☐ COM PROTOCOL #2 ☐ MOUNT #2

[ SUBMIT ] [ CANCEL ]

PERFORMANCE AND SPECIFICATION INFO FOR SELECTED SYSTEMS

|  | 1ST SYSTEM | 2ND SYSTEM | PROCESS INFO |
| --- | --- | --- | --- |
| MODEL # | SENSOR CMF 200; XMTR 2700 | SENSOR CMF 100; XMTR 2700 | FLOW METER |
| MASS FLOW RATE | 3201 LB/MIN | 1000 LB/MIN |  |
| MASS FLOW ACCURACY | 0.10% OF RATE | 0.10% OF RATE | 0.1-0.2 |
| PRESSURE LOSS AT MAX FLOW | 0.1 PSI | 0.61 PSI |  |
| VELOCITY AT MAX FLOW | 2.2 FT/SEC | 5.9 FT/SEC |  |
| FLOW REPEATABILITY | 0.05% | 0.05% |  |
| MAX PRESSURE LOSS | 0-5 PSI | 0-5 PSI | 0-5 PSI |
| WETTED MATERIAL | 316L SS | 316L SS | 316L SS |
| XMTR FEATURES | ANALOG | ANALOG | ANALOG |
| MEASUREMENT VARIABLES | FLOW RATE; TEMP | FLOW RATE; TEMP | FLOW RATE |
| COMPATABILITY | 100% | 100% |  |
| CONFIGURE ? |  |  |  |

SUBMIT  CANCEL

CONFIGURATION PARAMETER SELECTIONS FOR 1ST FLUID PROCESS SYSTEM

| | |
|---|---|
| SENSOR PROCESS CONNECTION | ▼ |
| SENSOR INDUSTRY APPROVAL | ▼ |
| SENSOR LANGUAGE | ▼ |
| SENSOR LABEL | ▼ |
| XMTR MOUNT | ▼ |
| XMTR DISPLAY | ▼ |
| XMTR OUTPUT | ▼ |
| XMTR POWER | ▼ |
| XMTR INDUSTRY APPROVAL | ▼ |
| XMTR LANGUAGE | ▼ |
| XMTR LABEL | ▼ |
| XMTR SOFTWARE | ▼ |
| FLOW RATE UNITS | ▼ |
| FLOW RATE OUTPUT | ▼ |
| FLOW RATE SCALE | ▼ |
| TEMPERATURE UNITS | ▼ |
| TEMPERATURE OUTPUT | ▼ |
| TEMPERATURE SCALE | ▼ |
| QUANTITY | ▼ |

[ SUBMIT ]  [ CANCEL ]

FLUID PROCESS SYSTEM SELECTION

RELATED CASES

This application is a continuation of application Ser. No. 10/503,522, filed Aug. 4, 2004, which was the National Stage of International Application No. PCT/US03/05013, filed Feb. 19, 2003, which claims the benefit of U.S. Provisional Application No. 60/361,767, filed Mar. 1, 2002. The disclosures of application Ser. No. 10/503,522, International Application No. PCT/US03/05013, and U.S. Provisional Application No. 60/361,767 are hereby incorporated herein by reference.

BACKGROUND OF THE INVENTION

1. Field of the Invention

The invention is related to the field of fluid process systems, and in particular, to the selection of fluid process systems for a user.

2. Statement of the Problem

Fluid process systems are used by industry to process liquids, slurries, and gasses. Fluid process systems measure and control flow, pressure, temperature, density, level, valve position, and other parameters. Some examples of fluid process systems include flow meters and control valves.

Fluid process systems are comprised of fluid process components. Some examples of fluid process components include sensors, transmitters, actuators, and valves. For example, a flow meter is a fluid process system that is comprised of a sensor component and a transmitter component. Likewise, a control valve is a fluid process system that is comprised of an actuator component and a valve component. Many other fluid process systems and components are known.

Suppliers are introducing Internet web sites that allow users to purchase fluid process systems. To purchase a fluid process system from the web site, the user first selects the individual components that comprise the desired fluid process system. For example, the user may select a sensor component and a transmitter component that comprise a flow meter. Note that the user selects the fluid process system by selecting and combining individual fluid process components. Unfortunately, the user may combine fluid process components in an incompatible manner that leads to multiple selection iterations to correct the incompatibility. Overall, the current selection process can be too frustrating and take too much time.

Fluid process components have their own performance and specification information, such as model number, temperature rating, and size. Unfortunately, the user has to collate individual component information to assess performance of the resulting fluid process system. For example, the user has to collate individual component information for a sensor and a transmitter to assess the performance of a flow meter. This complex task is further compounded by the possible need to compare various systems that are suitable for the fluid process of interest. The user must then collate component information to the system level for multiple fluid process systems. Again, the current selection process can be too frustrating and take too much time—especially for users that lack sufficient technical training.

SUMMARY OF THE SOLUTION

The invention helps solve the above problems with new technology to select fluid process systems. Advantageously, the new technology does not force users to select each fluid process component in order to select the fluid process system. Advantageously, the new technology does not force users to collate component information to assess system-level performance. Thus, the new technology can relieve the frustration of users who select fluid process systems and reduce the time required to select fluid process systems. The new technology can also reduce the technical training that is required for users who select fluid process systems.

Aspects of the invention include a method of operating a selection system to select fluid process systems. The method comprises: transferring a first signal that indicates user prompts; receiving a second signal that indicates user inputs provided responsive to the user prompts wherein the user inputs indicate fluid process information; processing the fluid process information to select a first one of the fluid process systems; obtaining the first performance and specification information for the first one of the fluid process systems; and transferring a third signal that indicates the first performance and specification information for the first one of the fluid process systems.

Aspects of the invention include processing the fluid process information to select a second one of the fluid process systems; and obtaining second performance and specification information for the second one of the fluid process systems, and wherein the third signal also indicates the second performance and specification information for the second one of the fluid process systems.

Aspects of the invention include wherein the third signal is configured to direct a side-by-side display of the first performance and specification information and the second performance and specification information to provide a performance comparison between the first one of the fluid process systems and the second one of the fluid process systems.

Aspects of the invention include receiving a fourth signal that indicates a user request to configure the first one of the fluid process systems; processing the user request and responsively transferring a fifth signal indicating configuration parameter options for the first one of the fluid process systems; and receiving a sixth signal indicating configuration parameter selections for the first one of the fluid process systems.

Aspects of the invention include processing the configuration parameter selections to determine incompatible ones of the configuration parameter selections for the first one of the fluid measurement systems; and transferring a seventh signal indicating the incompatible ones of the configuration parameter selections for the first one of the fluid measurement systems.

Aspects of the invention include wherein the configuration parameter options include industry approvals and process connections.

Aspects of the invention include wherein the configuration parameter options include tag labels, measurement variables, and units of measure for the measurement variables.

Aspects of the invention include wherein the fluid process information indicates data for fluid, flow rate, pressure, and temperature.

Aspects of the invention include wherein the third signal is configured to direct a side-by-side display of the first performance and specification information and the data for fluid, flow rate, pressure, and temperature to provide a comparison between the first one of the fluid process systems and the data for fluid, flow rate, pressure, and temperature.

Aspects of the invention include wherein the processing system is configured to determine a compatibility grade for the first one of the fluid process systems based on the data for fluid, flow rate, pressure, and temperature, and wherein the third signal also indicates the compatibility grade.

Aspects of the invention include wherein the process information indicates process fluid, maximum flow rate, maximum process pressure, and maximum temperature.

Aspects of the invention include wherein the process information indicates measurement variables, measurement accuracy, and communication protocol.

Aspects of the invention include wherein the process information indicates a first fluid process component and the selected one of the fluid process systems includes the first fluid process component and at least a second fluid process component.

Aspects of the invention include wherein the first fluid process component and the second fluid process component comprise a sensor and a transmitter.

Aspects of the invention include wherein the first fluid process component and the second fluid process component comprises an actuator and a valve.

Aspects of the invention include wherein the first performance and specification information indicates a sensor model number and a transmitter model number.

Aspects of the invention include wherein the first performance and specification information indicates a valve model number and an actuator model number.

Aspects of the invention include wherein the first performance and specification information indicates a picture of the first one of the fluid process systems.

Aspects of the invention include wherein the selection system comprises an Internet web site.

Aspects of the invention include wherein the selection system comprises a user computer system.

Aspects of the invention include a selection system to select fluid process systems. The selection system comprises an interface and a processing system. The interface is configured to transfer a first signal that indicates user prompts, receive a second signal that indicates user inputs provided responsive to the user prompts wherein the user inputs indicate fluid process information, and transfer a third signal that indicates first performance and specification information for a first one of the fluid process systems. The processing system is configured to direct the interface to transfer the first signal, process the fluid process information to select the first one of the fluid process systems, obtain the first performance and specification information for the first one of the fluid process systems, and direct the interface to transfer the third signal.

Aspects of the invention include wherein the processing system is configured to process the fluid process information to select a second one of the fluid process systems, and obtain second performance and specification information for the second one of the fluid process systems, and wherein the third signal also indicates the second performance and specification information for the second one of the fluid process systems.

Aspects of the invention include wherein the third signal is configured to direct a side-by-side display of the first performance and specification information and the second performance and specification information to provide a performance comparison between the first one of the fluid process systems and the second one of the fluid process systems.

Aspects of the invention include wherein the interface is configured to receive a fourth signal that indicates a user request to configure the first one of the fluid process systems, transfer a fifth signal indicating configuration parameter options for the first one of the fluid process systems, and receive a sixth signal indicating configuration parameter selections for the first one of the fluid process systems; and the processing system is configured process the user request to direct the interface to transfer the fifth signal.

Aspects of the invention include wherein the interface is configured to transfer a seventh signal indicating incompatible ones of the configuration parameter selections for the first one of the fluid measurement systems; and the processing system is configured process the configuration parameter selections to determine the incompatible ones of the configuration parameter selections for the first one of the fluid measurement systems and direct the interface to transfer the seventh signal.

Aspects of the invention include wherein the configuration parameter options include industry approvals and process connections.

Aspects of the invention include wherein the configuration parameter options include tag labels, measurement variables, and units of measure for the measurement variables.

Aspects of the invention include wherein the fluid process information indicates data for fluid, flow rate, pressure, and temperature.

Aspects of the invention include wherein the third signal is configured to direct a side-by-side display of the first performance and specification information and the data for fluid, flow rate, pressure, and temperature to provide a comparison between the first one of the fluid process systems and the data for fluid, flow rate, pressure, and temperature.

Aspects of the invention include wherein the processing system is configured to determine a compatibility grade for the first one of the fluid process systems based on the data for fluid, flow rate, pressure, and temperature, and wherein the third signal also indicates the compatibility grade.

Aspects of the invention include wherein the process information indicates process fluid, maximum flow rate, maximum process pressure, and maximum temperature.

Aspects of the invention include wherein the process information indicates measurement variables, measurement accuracy, and communication protocol.

Aspects of the invention include wherein the process information indicates a first fluid process component and the selected one of the fluid process systems includes the first fluid process component and at least a second fluid process component.

Aspects of the invention include wherein the first fluid process component and the second fluid process component comprise a sensor and a transmitter.

Aspects of the invention include wherein the first fluid process component and the second fluid process component comprises an actuator and a valve.

Aspects of the invention include wherein the first performance and specification information indicates a sensor model number and a transmitter model number.

Aspects of the invention include wherein the first performance and specification information indicates a valve model number and an actuator model number.

Aspects of the invention include wherein the first performance and specification information indicates a picture of the first one of the fluid process systems.

Aspects of the invention include wherein the interface comprises a web site Internet interface.

Aspects of the invention include wherein the interface comprises a computer system user interface.

Aspects of the invention include a product for selecting fluid process systems. The product comprises software and a storage system that stores the software. The software is configured to direct a processing system to direct an interface to transfer a first signal that indicates user prompts wherein the interface receives a second signal that indicates user inputs provided responsive to the user prompts wherein the user inputs indicate fluid process information, to direct the processing system to process the fluid process information to select a first one of the fluid process systems, obtain first performance and specification information for the first one of the fluid process systems, and direct the interface to transfer a third signal that indicates first performance and specification information for a first one of the fluid process systems.

Aspects of the invention include wherein the software is configured to direct the processing system to process the fluid process information to select a second one of the fluid process systems and obtain second performance and specification information for the second one of the fluid process systems, and wherein the third signal also indicates the second performance and specification information for the second one of the fluid process systems.

Aspects of the invention include wherein the third signal is configured to direct a side-by-side display of the first performance and specification information and the second performance and specification information to provide a performance comparison between the first one of the fluid process systems and the second one of the fluid process systems.

Aspects of the invention include wherein the interface receives a fourth signal that indicates a user request to configure the first one of the fluid process systems, the software is configured to direct the processing systems to process the user request to direct the interface to transfer a fifth signal that indicates configuration parameter options for the first one of the fluid process systems, and the interface receives a sixth signal indicating configuration parameter selections for the first one of the fluid process systems.

Aspects of the invention include wherein the software is configured to direct the processing system to process the configuration parameter selections to determine incompatible ones of the configuration parameter selections for the first one of the fluid measurement systems and direct the interface to transfer a seventh signal that indicates the incompatible ones of the configuration parameter selections for the first one of the fluid measurement systems.

Aspects of the invention include wherein the configuration parameter options include industry approvals and process connections.

Aspects of the invention include wherein the configuration parameter options include tag labels, measurement variables, and units of measure for the measurement variables.

Aspects of the invention include wherein the fluid process information indicates data for fluid, flow rate, pressure, and temperature.

Aspects of the invention include wherein the third signal is configured to direct a side-by-side display of the first performance and specification information and the data for fluid, flow rate, pressure, and temperature to provide a comparison between the first one of the fluid process systems and the data for fluid, flow rate, pressure, and temperature.

Aspects of the invention include wherein the software is configured to direct the processing system to determine a compatibility grade for the first one of the fluid process systems based on the data for fluid, flow rate, pressure, and temperature, and wherein the third signal also indicates the compatibility grade.

Aspects of the invention include wherein the process information indicates process fluid, maximum flow rate, maximum process pressure, and maximum temperature.

Aspects of the invention include wherein the process information indicates measurement variables, measurement accuracy, and communication protocol.

Aspects of the invention include wherein the process information indicates a first fluid process component and the selected one of the fluid process systems includes the first fluid process component and at least a second fluid process component.

Aspects of the invention include wherein the first fluid process component and the second fluid process component comprise a sensor and a transmitter.

Aspects of the invention include wherein the first fluid process component and the second fluid process component comprises an actuator and a valve.

Aspects of the invention include wherein the first performance and specification information indicates a sensor model number and a transmitter model number.

Aspects of the invention include wherein the first performance and specification information indicates a valve model number and an actuator model number.

Aspects of the invention include wherein the first performance and specification information indicates a picture of the first one of the fluid process systems.

Aspects of the invention include wherein the interface comprises a web site Internet interface.

Aspects of the invention include wherein the interface comprises a computer system user interface.

DESCRIPTION OF THE DRAWINGS

FIG. 3 illustrates a display of user prompts in an example of the invention.

FIG. 4 illustrates a comparative display of process information, performance and specification information, and compatibility grades in an example of the invention.

FIG. 5 illustrates a display of configuration parameter options in an example of the invention.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Selection System Configuration

Figure 1:
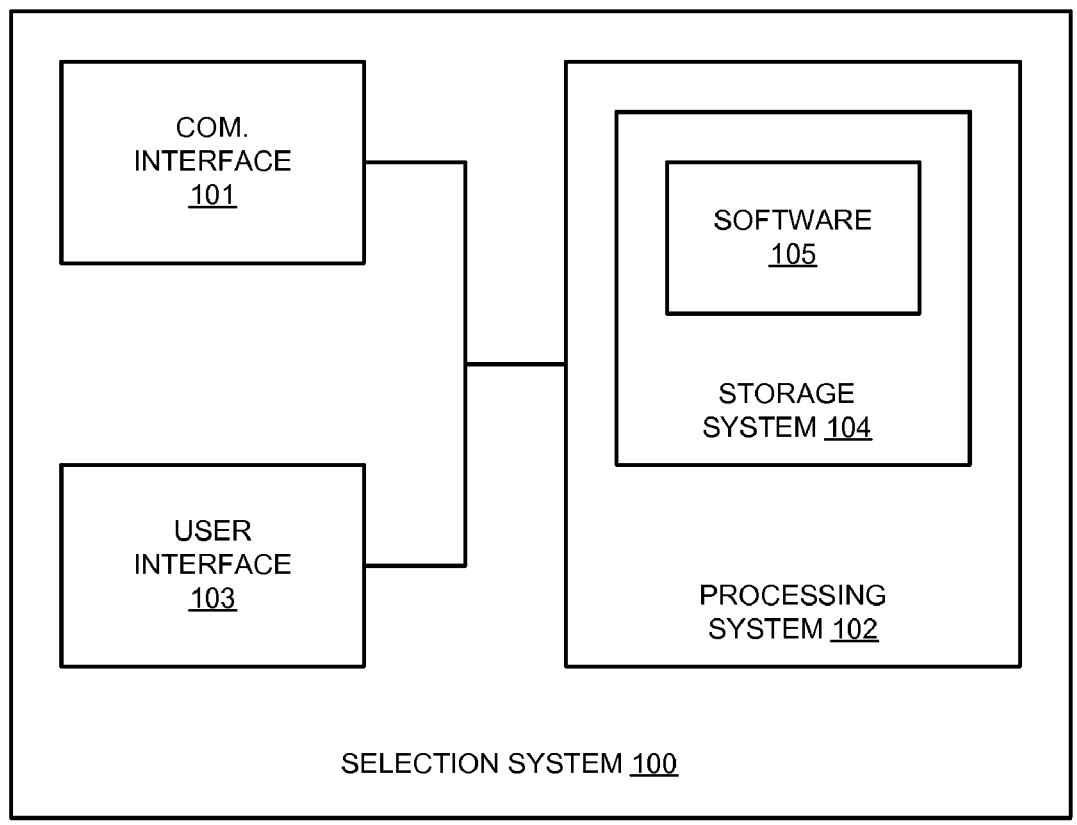
FIG. 1 illustrates a selection system configuration in an example of the invention.

FIG. 1 illustrates selection system configuration in an example of the invention. Selection system 100 includes communication interface 101, processing system 102, and user interface 103. Processing system 102 includes storage system 104. Storage system 104 stores software 105. Processing system 102 is linked to communication interface 101 and user interface 103. Selection system 100 could be comprised of a programmed general-purpose computer, although those skilled in the art will appreciate that programmable or special purpose circuitry and equipment may be used. Selection system 100 may use a client server architecture where operations are distributed among a server system and client devices that together comprise elements 101-105.

Communication interface 101 could comprise an Internet interface, network interface card, modem, communication port, or some other communication device. Communication interface 101 may be distributed among multiple devices. Processing system 102 could comprise a microprocessor, logic circuitry, or some other processing device. Processing system 102 may be distributed among multiple devices. User interface 103 could comprise a keyboard, mouse, voice recognition interface, microphone and speakers, graphical display, touch screen, or some other type of user device. User interface 103 could be distributed among multiple user devices. Storage system 104 could comprise a disk, tape, integrated circuit, server, or some other memory device. Storage system 104 may be distributed among multiple devices.

Processing system 102 retrieves and executes software 105 from storage system 104. Software 105 may comprise an operating system, utilities, drivers, networking software, and other software typically loaded onto a general-purpose computer. Software 105 could comprise an application program, firmware, programmed circuitry, or some other form of machine-readable processing instructions. When executed by processing system 102, software 105 directs processing system 102 to operate as described herein.

In response to user inputs, selection system 100 selects fluid process systems for the users. In some variations, the users access selection system 100 through communication interface 101 over a communication network, such as the Internet or public telephone network. In other variations, the users access selection system 100 directly through user interface 103. Thus, selection system 100 could be a web site on the Internet or a stand-alone system. In the following discussion, the term "interface" refers to interface 101 and interface 103, and the term "signal" refers to the information exchanged between interface 101 and a communication system and between interface 103 and a user.

Selection System Operation—Example #1

Figure 2:
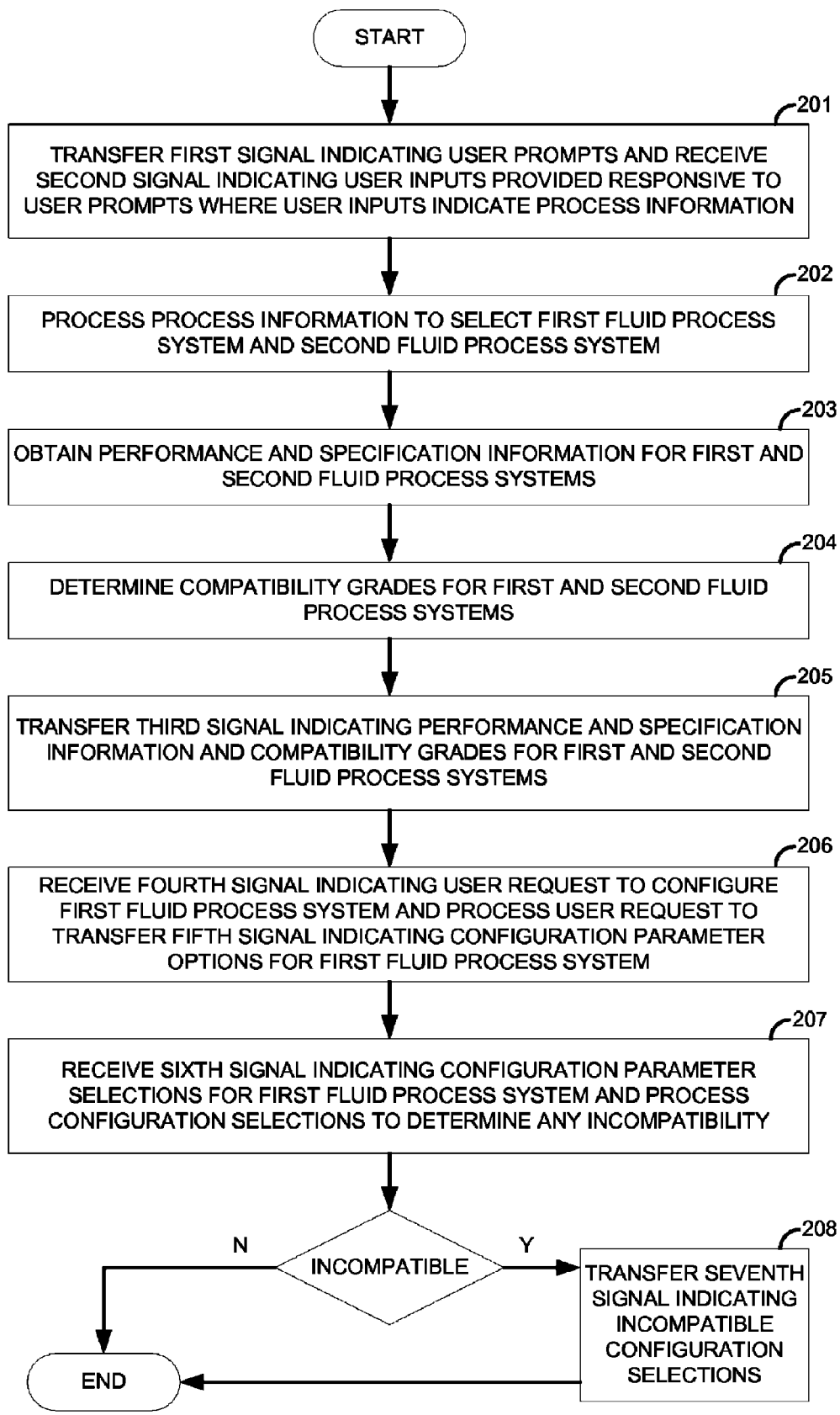
FIG. 2 illustrates selection system operation in an example of the invention.

FIG. 2 illustrates selection system operation in an example of the invention, and the reference numbers from FIG. 2 are indicated parenthetically below. The processing system directs the interface to transfer a first signal indicating user prompts, and the interface transfers the first signal. The interface then receives a second signal that indicates the user inputs provided responsive to the user prompts (201). FIG. 3 illustrates display 300 of user prompts in an example of the invention. The user may provide user inputs in response to the user prompts through check boxes, drop down menus, text boxes, or some other form of user input. The user inputs indicate process information for fluid, flow rate, pressure, and temperature. The process information may indicate the actual process fluid, maximum flow rate, maximum process pressure, maximum temperature, measurement variables, measurement accuracy, communication protocol, or some other information regarding the fluid process of interest.

The processing system then processes the received process information to select a first fluid process system and a second fluid process system (202). Note that two fluid process systems are selected in this example for illustrative purposes, but the selection system may select only a single fluid process system, or may select more than two fluid process systems. To make the selections, the processing system accesses a database and algorithm that correlates each potential set of appropriate process information with the specific fluid process components that comprise the selected fluid process system. These correlations could be user specific, so a specific user could select a pre-determined system by providing the corresponding process information.

For example, the following process information could be specified in the user inputs:
PRODUCT: FLOW METER
FLUID NAME: WATER
WETTED MATERIAL: 316 L STAINLESS STEEL
MASS FLOW ACCURACY: 0.1-0.2
MAXIMUM PRESSURE LOSS: 0-5 PSI
TRANSMITTER FEATURES: ANALOG
MEASUREMENT VARIABLES: FLOW RATE
UNITS: BOTH US AND METRIC This combination of process information could be pre-associated with two flow meter systems through the database and algorithm. For example, the first flow meter system could be comprised of sensor component model number CMF 200 and transmitter component model number 2700; and the second flow meter system could be comprised of sensor component model number CMF 100 and transmitter component model number 2700.

After system selection, the processing system obtains performance and specification information for the first and second fluid process systems (203). The processing system determines compatibility grades for the first and second fluid process systems based on this performance and specification information and based on the received process information for fluid, flow rate, pressure, and temperature (204). The compatibility grades would indicate how close the performance and specification information matches the process information for the given user inputs and selected fluid process system.

The processing system then directs the interface to transfer a third signal, and the interface transfers the third signal (205). The third signal indicates the performance and specification information and the compatibility grades for the first fluid process system and the second fluid process system. The performance and specification information may also indicate: sensor model number, transmitter model number, valve model number, actuator model number, a picture of the fluid process system, maximum pressure and temperature ratings, measurement accuracy, or some other metrics regarding fluid process system performance or specification.

It should be noted that the performance and specification information for a system may differ from a combination of the performance and specification information of the individual components. For example, a lower performance sensor may reduce the accuracy of a higher performance transmitter. The resulting system-level transmitter performance would be lower than the performance listed for the transmitter component. Thus, performance and specification information for the system takes into account the interaction between components, instead of merely combining individual component performance information together.

The third signal can be configured to direct a side-by-side display of the performance and specification information for the first fluid process system and second fluid process system. This type of display provides a convenient and effective performance comparison between the first fluid process system and second fluid process system. The third signal may also be configured to direct a side-by-side display of the performance and specification information and the received process information. This type of display provides a convenient and effective comparison between the first and second fluid process systems and the received process information for fluid, flow rate, pressure, and temperature. FIG. 4 illustrates comparative display 400 of performance and specification information, process information, and compatibility grades in an example of the invention.

Once the selected system or systems are presented to the user, the interface may receive a fourth signal that indicates a user request to configure one of these systems, such as the first fluid process system. The processing system processes this user request to direct the interface to transfer a fifth signal that indicates configuration parameter options for the first fluid process system, and the interface transfers the fifth signal (207). FIG. 5 illustrates display 500 of configuration parameter options in an example of the invention. The configuration parameter options may include industry approvals, process connections, tag labels, measurement variables, units of measure for the measurement variables, or some other design parameter for the selected fluid process system. An example of an industry approval is an Underwriter Laboratories (UL) approval.

In response to the configuration parameter options, the interface receives a sixth signal indicating configuration parameter selections for the first fluid process system where the configuration parameter selections represent the configuration parameter options selected by the user. The processing system processes the configuration parameter selections to determine if any are incompatible (207). If any configuration parameter selections are incompatible, the processing system directs the interface to transfer a seventh signal that indicates the incompatible configuration parameter selections, and the interface transfers the seventh signal (208). The user may then resolve the incompatibility with alternative configuration parameter selections.

In addition to the above operations, the selection system may also provide additional functionality. The selection system may provide log-in and user registration, information and document search tools, message centers and multi-user forums, order entry and shopping carts, warranty information and order status, request for quote capability, information for accessories and spare parts, and other information related to the fluid process products and suppliers.

Selection System Operation—Example #2

Figure 6:
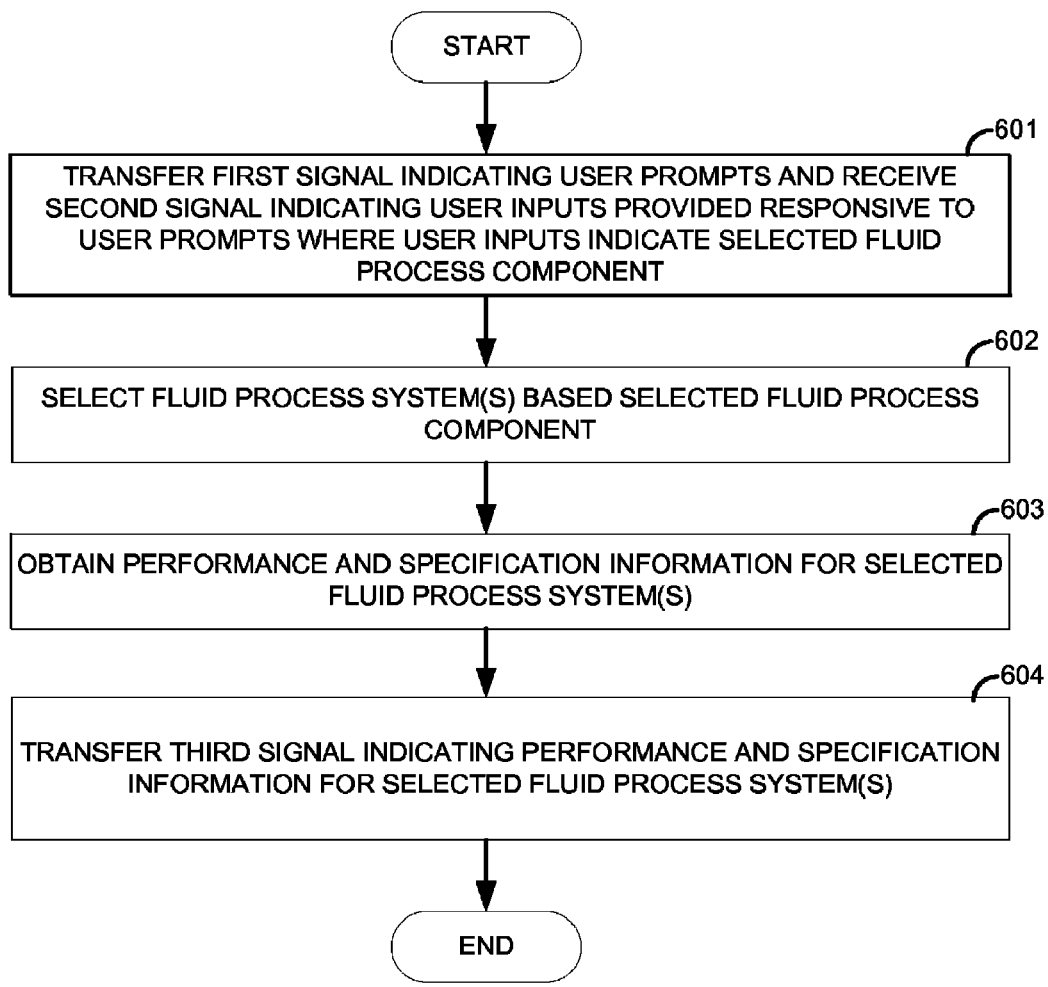
FIG. 6 illustrates selection system operation in an example of the invention.

FIG. 6 illustrates selection system operation in another example of the invention, and the reference numbers from FIG. 6 are indicated parenthetically below. The processing system directs the interface to transfer a first signal indicating user prompts, and the interface transfers the first signal. The user prompts may indicate a list of fluid process components. The interface then receives a second signal that indicates user inputs provided responsive to the user prompts (601). The user inputs indicate a selected first fluid process component. The processing system then selects a fluid process system or systems based on the first fluid process component (602). The selected fluid process systems comprise at least a second fluid process component and may comprise more than two fluid process components. The processing system then obtains performance and specification information for the selected fluid process systems (603). The processing system directs the interface to transfer a third signal that indicates the performance and specification information for the selected fluid process systems, and the interface transfers the third signal (604).

Note that based on the first fluid process component, the selection system may select a single fluid process system or multiple fluid process systems. The first fluid process component could be a sensor, transmitter, actuator, valve, or some other fluid process component. The selected fluid process system could include various combinations of these fluid process components. To make these selections, the processing system would access a database and algorithm that correlates each potential first fluid process component with a fluid process system or systems. These correlations could be user specific, so a specific user could select a pre-determined system by selecting only one of the system components. Once the fluid process system or systems are selected, the selection system may provide comparative performance displays, system configuration capability, component compatibility verification, and other functionality as described above for Example #1.

We claim:

1. A selection system to select fluid process systems, the selection system comprising:
   at least one computer processor with a processing system;
   at least one memory device;
   at least one communication interface device with an interface;
   an instruction set held in the at least one memory device and executable by the at least one computer processor;
   the interface configured to transfer a first signal that indicates user prompts, receive a second signal that indicates user inputs provided responsive to the user prompts wherein the user inputs indicate fluid process information, and transfer a third signal that indicates first performance and specification information for a first one of the fluid process systems; and
   the processing system configured to direct the interface to transfer the first signal, process the fluid process information to select the first one of the fluid process systems, obtain the first performance and specification information for the first one of the fluid process systems, and direct the interface to transfer the third signal, wherein the fluid process information indicates a first fluid process component and the selected one of the fluid process systems includes the first fluid process component and at least a second fluid process component with the first performance and specification information being based on an interaction between the first fluid process component and the at least second fluid process component;
   the interface receiving a fourth signal indicating a user request for configuring the first one of the fluid process systems, and transfer a fifth signal indicating configuration parameter options for the first one of the fluid process systems; and
   the processing system is configured to process the user request to direct the interface to transfer the fifth signal.

2. The selection system of claim 1 wherein the processing system is configured to process the fluid process information to select a second one of the fluid process systems, and obtain second performance and specification information for the second one of the fluid process systems, and wherein the third signal also indicates the second performance and specification information for the second one of the fluid process systems.

3. The selection system of claim 2 wherein the third signal is configured to direct a side-by-side display of the first performance and specification information and the second performance and specification information to provide a performance comparison between the first one of the fluid process systems and the second one of the fluid process systems.

4. The selection system of claim 1 wherein:
   the interface is configured to receive a sixth signal indicating the configuration parameter selections for the first one of the fluid measurement systems; and
   the processing system is configured to process the configuration parameter selections to determine incompatible ones of the configuration parameter selections for the first one of the fluid measurement systems and direct the interface to transfer a seventh signal indicating incompatible configuration parameter selections.

5. The selection system of claim 1 wherein the configuration parameter options include industry approvals and process connections.

6. The selection system of claim 1 wherein the configuration parameter options include tag labels, measurement variables, and units of measure for the measurement variables.

7. The selection system of claim 1 wherein the fluid process information indicates data for fluid, flow rate, pressure, and temperature.

8. The selection system of claim 7 wherein the third signal is configured to direct a side-by-side display of the first performance and specification information and the data for fluid, flow rate, pressure, and temperature.

9. The selection system of claim 1 wherein the processing system is configured to determine a compatibility grade for the first one of the fluid process systems based on the data for fluid, flow rate, pressure, and temperature, and wherein the third signal also indicates the compatibility grade.

10. The selection system of claim 1 wherein the fluid process information indicates process fluid, maximum flow rate, maximum process pressure, and maximum temperature.

11. The selection system of claim 1 wherein the fluid process information indicates measurement variables, measurement accuracy, and communication protocol.

12. The selection system of claim 1 wherein the first fluid process component and the second fluid process component comprise a sensor and a transmitter.

13. The selection system of claim 1 wherein the first fluid process component and the second fluid process component comprises an actuator and a valve.

14. The selection system of claim 1 wherein the first performance and specification information indicates a sensor model number and a transmitter model number.

15. The selection system of claim 1 wherein the first performance and specification information indicates a valve model number and an actuator model number.

16. The selection system of claim 1 wherein the first performance and specification information indicates a picture of the first one of the fluid process systems.

17. The selection system of 1 wherein the interface comprises a web site Internet interface.

18. The selection system of claim 1 wherein the interface comprises a computer system user interface.

19. A method of operating a selection system to select fluid process systems, the method comprising:
transferring, from a computer device, a first signal that indicates user prompts;
receiving, by the computer device, a second signal that indicates user inputs provided responsive to the user prompts wherein the user inputs indicate fluid process information;
processing, by the computer device, the fluid process information to select a first one of the fluid process systems, wherein the selected first one of the fluid process systems comprises a first fluid process component and at least a second fluid process component;
obtaining, by the computer device, the first performance and specification information for the first one of the fluid process systems based on an interaction between the first fluid process component and the at least second fluid process component; and
transferring, from the computer device, a third signal that indicates the first performance and specification information for the first one of the fluid process systems;
receiving, by the computer device, a fourth signal indicating a user request for configuring the first one of the fluid process systems; and
transferring, from the computer device, a fifth signal indicating configuration parameter options for the first one of the fluid process systems.

20. The method of claim 19 further comprising:
processing, by the computer device, the fluid process information to select a second one of the fluid process systems; and
obtaining, by the computer device, second performance and specification information for the second one of the fluid process systems, and wherein the third signal also indicates the second performance and specification information for the second one of the fluid process systems.

21. The method of claim 20 wherein the third signal is configured to direct a side-by-side display of the first performance and specification information and the second performance and specification information to provide a performance comparison between the first one of the fluid process systems and the second one of the fluid process systems.

22. The method of claim 19 further comprising:
receiving, by the computer device, a sixth signal indicating configuration parameter selections for the first one of the fluid measurement systems; and
transferring, from the computer device, a seventh signal indicating incompatible ones of the configuration parameter selections for the first one of the fluid measurement systems.

23. The method of claim 19 wherein the configuration parameter options include industry approvals and process connections.

24. The method of claim 19 wherein the configuration parameter options include tag labels, measurement variables, and units of measure for the measurement variables.

25. The method of claim 19 wherein the fluid process information indicates data for fluid, flow rate, pressure, and temperature.

26. The method of claim 25 wherein the third signal is configured to direct a side-by-side display of the first performance and specification information and the data for fluid, flow rate, pressure, and temperature.

27. The method of claim 19 wherein the processing system is configured to determine a compatibility grade for the first one of the fluid process systems based on the data for fluid, flow rate, pressure, and temperature, and wherein the third signal also indicates the compatibility grade.

28. The method of claim 19 wherein the fluid process information indicates process fluid, maximum flow rate, maximum process pressure, and maximum temperature.

29. The method of claim 19 wherein the fluid process information indicates measurement variables, measurement accuracy, and communication protocol.

30. The method of claim 19 wherein the first fluid process component and the second fluid process component comprise a sensor and a transmitter.

31. The method of claim 19 wherein the first fluid process component and the second fluid process component comprises an actuator and a valve.

32. The method of claim 19 wherein the first performance and specification information indicates a sensor model number and a transmitter model number.

33. The method of claim 19 wherein the first performance and specification information indicates a valve model number and an actuator model number.

34. The method of claim 20 wherein the first performance and specification information indicates a picture of the first one of the fluid process systems.

35. The method of claim 19 wherein the selection system comprises an Internet web site.

36. The method of claim 19 wherein the selection system comprises a user computer system.

37. A non-transitory computer program product comprising computer usable medium having executable code for executing a process for selecting fluid process systems, the process comprising:
 directing an interface to transfer a first signal that indicates user prompts, wherein the interface receives a second signal that indicates user inputs provided responsive to the user prompts wherein the user inputs indicate fluid process information;
 directing the processing system to process the fluid process information to:
 select a first one of the fluid process systems comprising a first fluid process component and at least second fluid process component;
 obtain first performance and specification information for the first one of the fluid process systems based on an interaction between the first fluid process component and the at least second fluid process component;
 direct the interface to transfer a third signal that indicates first performance and specification information for a first one of the fluid process systems; and
 directing the processing systems to receive a fourth signal that indicates a user request for configuring the first one of the fluid process systems, and the interface transfers a fifth signal indicating configuration parameter options for the first one of the fluid process systems.

38. The non-transitory computer program product of claim 37 wherein the process further comprises directing the processing system to process the fluid process information to select a second one of the fluid process systems and obtain second performance and specification information for the second one of the fluid process systems, and wherein the third signal also indicates the second performance and specification information for the second one of the fluid process systems.

39. The non-transitory computer program product of claim 38 wherein the third signal is configured to direct a side-by-side display of the first performance and specification information and the second performance and specification information to provide a performance comparison between the first one of the fluid process systems and the second one of the fluid process systems.

40. The non-transitory computer program product of claim 37 wherein the process directs the processing system to receive a sixth signal indicating configuration parameter selections for the first one of the fluid measurement systems and direct the interface to transfer a seventh signal that indicates incompatible ones of the configuration parameter selections for the first one of the fluid measurement systems.

41. The non-transitory computer program product of claim 37 wherein the configuration parameter options include industry approvals and process connections.

42. The non-transitory computer program product of claim 37 wherein the configuration parameter options include tag labels, measurement variables, and units of measure for the measurement variables.

43. The non-transitory computer program product of claim 37 wherein the fluid process information indicates data for fluid, flow rate, pressure, and temperature.

44. The non-transitory computer program product of claim 43 wherein the third signal is configured to direct a side-by-side display of the first performance and specification information and the data for fluid, flow rate, pressure, and temperature.

45. The non-transitory computer program product of claim 37 wherein the software is configured to direct the processing system to determine a compatibility grade for the first one of the fluid process systems based on the data for fluid, flow rate, pressure, and temperature, and wherein the third signal also indicates the compatibility grade.

46. The non-transitory computer program product of claim 37 wherein the fluid process information indicates process fluid, maximum flow rate, maximum process pressure, and maximum temperature.

47. The non-transitory computer program product of claim 37 wherein the fluid process information indicates measurement variables, measurement accuracy, and communication protocol.

48. The non-transitory computer program product of claim 37 wherein the first fluid process component and the second fluid process component comprise a sensor and a transmitter.

49. The non-transitory computer program product of claim 37 wherein the first fluid process component and the second fluid process component comprises an actuator and a valve.

50. The non-transitory computer program product of claim 37 wherein the first performance and specification information indicates a sensor model number and a transmitter model number.

51. The non-transitory computer program product of claim 37 wherein the first performance and specification information indicates a valve model number and an actuator model number.

52. The non-transitory computer program product of claim 37 wherein the first performance and specification information indicates a picture of the first one of the fluid process systems.

53. The non-transitory computer program product of claim 37 wherein the interface comprises a web site Internet interface.

54. The non-transitory computer program product of claim 37 wherein the interface comprises a computer system user interface.

* * * * *